F. H. MEYER.
LICENSE NUMBER HOLDER FOR AUTOMOBILES.
APPLICATION FILED MAR. 31, 1917.
1,278,071. Patented Sept. 3, 1918.
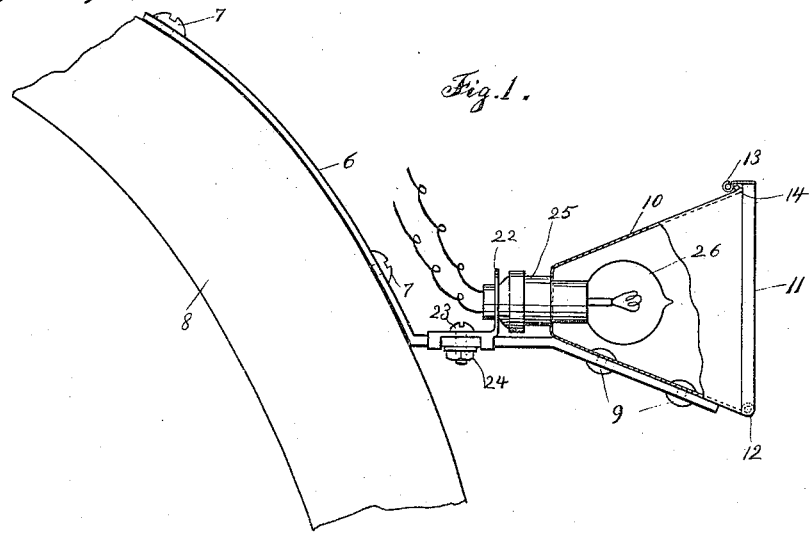
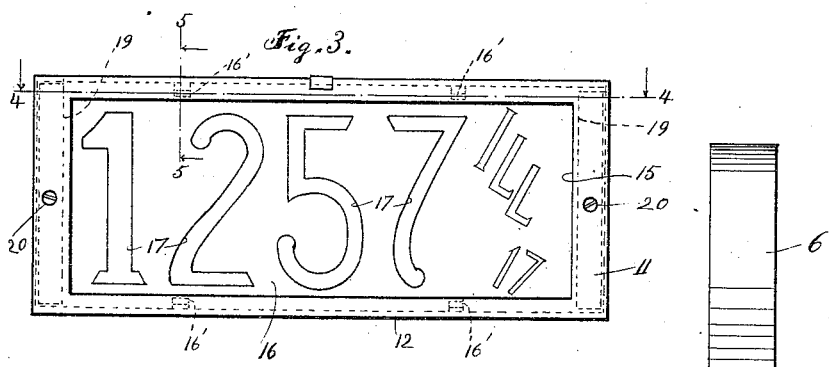
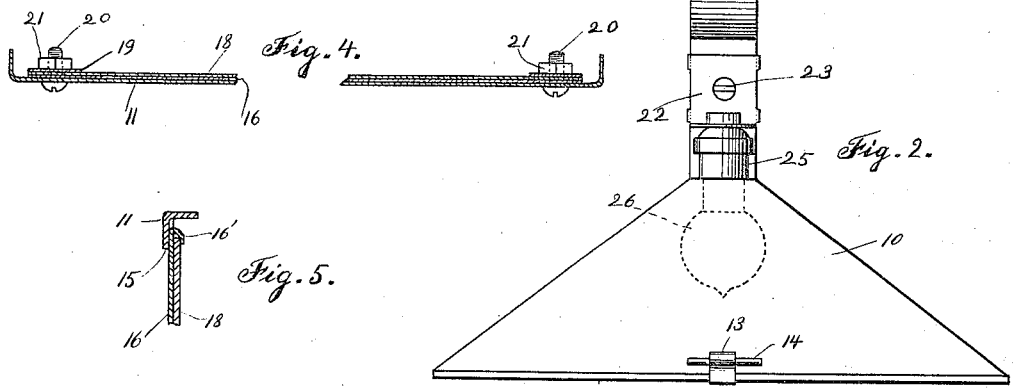
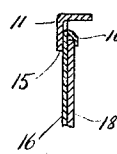
Inventor:
Frederick H. Meyer,
By Joshua R. H. Potts
his Attorney.
Witnesses:
J. A. Klostermann
A. A. Olson

UNITED STATES PATENT OFFICE.

FREDERICK H. MEYER, OF CHICAGO, ILLINOIS.

LICENSE-NUMBER HOLDER FOR AUTOMOBILES.

1,278,071.　　　　　Specification of Letters Patent.　　Patented Sept. 3, 1918.

Application filed March 31, 1917.　Serial No. 158,891.

*To all whom it may concern:*

Be it known that I, FREDERICK H. MEYER, a citizen of the United States, and a resident of the city of Chicago, county of Cook, and State of Illinois, have invented certain new and useful Improvements in License-Number Holders for Automobiles, of which the following is a specification.

My invention relates to improvements in license number holders for automobiles and has for its object the production of a device of this character which may be used as effectually at night as during the day time. A further object is the production of a device of this character which will be highly efficient in use. Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a fragmentary side view of one of the rear mud guards of an automobile to which is applied a license number holder embodying the invention, said holder being shown partly in section, Fig. 2, a top plan view of the holder, Fig. 3, a rear elevation of the same, Fig. 4, an enlarged detail section taken on line 4—4 of Fig. 3, the central portion of the construction shown in this figure being broken away, and Fig. 5, a detail section taken on line 5—5 of Fig. 3.

The preferred form of construction as illustrated in the drawings comprises a bracket 6 in the form of a single piece of strap iron which is bent into the form desired, the forward end of said bracket being curved and perforated for fastening by means of screws 7 to one of the rear mud guards 8 of the automobile in connection with which the device is to be employed.

Secured by means of suitable fastening devices 9 to the rearward end of the bracket 6 is a sheet metal casing 10 of forwardly tapering form, the rearward or enlarged end of said casing being provided with a wall or door 11 hingedly secured to said casing at its lower edge as at 12. A spring clip 13 is provided at the upper free edge of said door 11 adapted for engagement with a projection 14 on the top wall of the casing to releasably hold the door in closed or operative position.

Said door 11 is formed with a rectangular opening 15, and arranged at the rearward side of said door is a metallic plate 16 in which are formed openings 17 to constitute the license number of the automobile in connection with which the device is employed, as clearly seen in Fig. 3. At the rearward side of plate 16 is provided a transparency 18 of celluloid or other suitable material which may be colored if desired. The transparency 18 is securely held in position upon the plate 16 by means of lugs 16' which are formed in the upper and lower edges of said plate and which are bent into engagement with the adjacent edge portions of the transparency as seen in Figs. 3 and 5. Said plate and transparency are detachably secured to the door 11 by means of two bars 19 arranged at the inner side of said transparency in engagement with the ends thereof, screws 20 and coöperating nuts 21 coöperating with said bars so that the parts 16 and 19 are clamped between said bars and the end portions of the wall 11 as will be readily understood. The arrangement is such as will be seen that the license number plate 16 may be readily and easily removed when desired to permit of insertion of another plate for different years when new license numbers are assigned.

Arising from the bracket 6 adjacent the front end of casing 10 is a supplemental supporting member or bracket 22 having a channel formed base which embraces the adjacent portion of bracket 6, said base of member 22 being detachably secured to bracket 6 by means of a screw 23 and coöperating nut 24. Supported by the supplemental bracket 22 is an electric lamp socket 25 the rearward end of the latter projecting loosely through a circular opening provided in the forward end of casing 10 into the interior of the latter for the support of electric lamp bulb 26 whereby the device may be illuminated. The detachable mounting of the supplemental bracket 22 renders assembling or disassembling of the device very easy, it being clear that in case removal of the electric lamp is desired, it is only necessary to detach the supplemental bracket 22, and remove the bulb 26, in which event the socket 25 may be slid from engagement with the casing.

The arrangement is such as will be seen that the license number of the vehicle will be displayed during the day, and at night the electric lamp will serve as a means of illumination for the license number.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A license number holder for automobiles comprising a bracket; a casing supported by said bracket; a transparent wall at the rearward side of said casing; a supporting member arising from said bracket adjacent the front side of said casing; an electric lamp socket supported by said member and projecting loosely through the front wall of said casing into the interior thereof; and an electric lamp bulb supported by the inner end of said socket, substantially as described.

2. A license number holder for automobiles comprising a bracket; a casing supported by said bracket; a transparent wall at the rearward side of said casing; a supporting member arising from and detachably secured to said bracket adjacent the front side of said casing; an electric lamp socket supported by said member and projecting loosely through the front wall of said casing into the interior thereof; and an electric lamp bulb supported by the inner end of said socket, substantially as described.

3. A license number holder for automobiles comprising a bracket; a casing supported by said bracket; a transparent wall at the rearward side of said casing; a supporting member arising from said bracket and adjacent the front side of said casing, said supporting member having a channel formed base embracing said bracket; means for detachably fastening said base to said bracket; an electric lamp socket supported by said member and projecting through the front wall of said casing into the interior thereof; and an electric lamp bulb supported by the inner end of said socket, substantially as described.

In testimony whereof I have signed my name to this specification in the presence of two subscribing witnesses.

FREDERICK H. MEYER.

Witnesses:
JOSHUA R. H. POTTS,
JOSEPH C. LOERZEL.